July 9, 1968 E. M. THOMASON ET AL 3,392,379
STATIC LOGIC ANNUNCIATOR
Filed Oct. 5, 1964 5 Sheets-Sheet 1
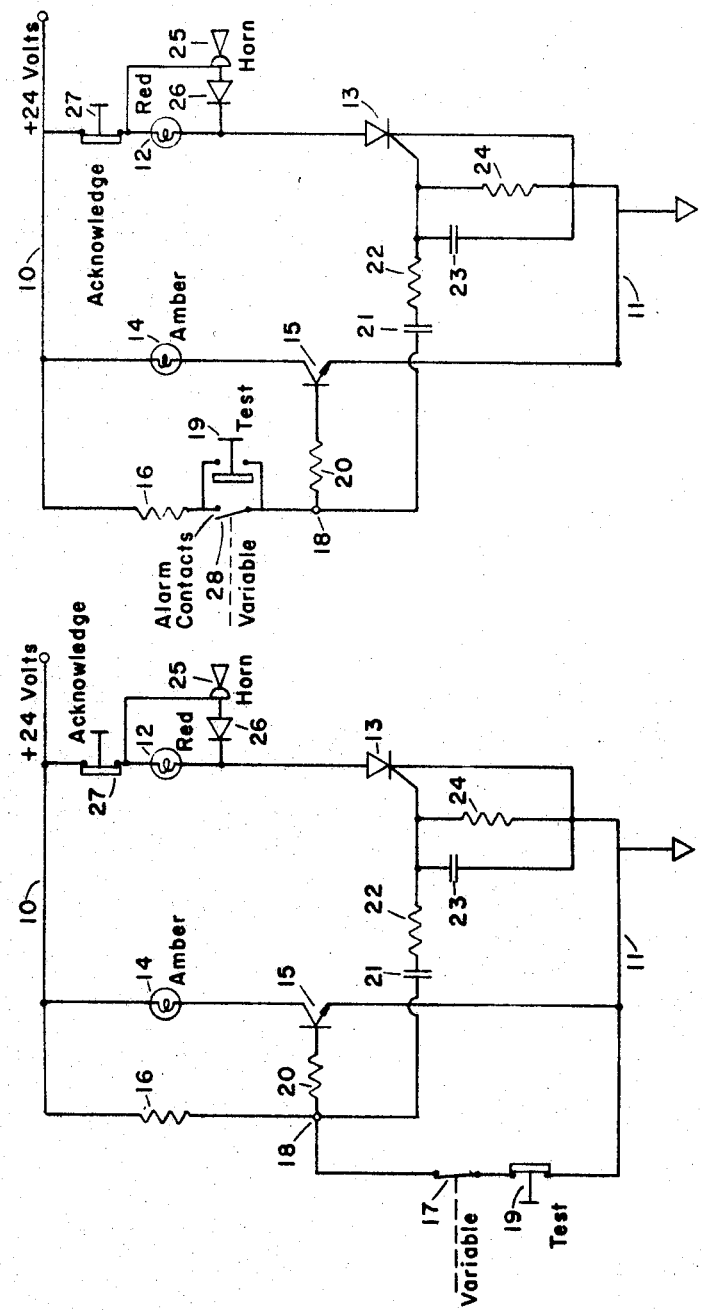
Edward M. Thomason
Mauro G. Togneri
Charles J. Baltzer
INVENTOR.
BY
ATTORNEY July 9, 1968 E. M. THOMASON ET AL 3,392,379
STATIC LOGIC ANNUNCIATOR
Filed Oct. 5, 1964 5 Sheets-Sheet 2

Edward M. Thomason
Mauro G. Togneri
Charles J. Baltzer
INVENTOR.

BY
Paul C. Kingon
ATTORNEY

Edward M. Thomason
Mauro G. Togneri
Charles J. Baltzer
INVENTOR.

July 9, 1968  E. M. THOMASON ET AL  3,392,379
STATIC LOGIC ANNUNCIATOR
Filed Oct. 5, 1964  5 Sheets-Sheet 5

Edward M. Thomason
Mauro G. Togneri
Charles J. Baltzer
INVENTOR.

BY
Paul C. Kingou
ATTORNEY

United States Patent Office 3,392,379
Patented July 9, 1968

3,392,379
STATIC LOGIC ANNUNCIATOR
Edward M. Thomason and Mauro G. Togneri, Dickinson, and Charles J. Baltzer, Austin, Tex., assignors to Monsanto Company, St. Louis, Mo., a corporation of Delaware
Filed Oct. 5, 1964, Ser. No. 402,068
15 Claims. (Cl. 340—213.1)

This invention relates to annunciator or alarm systems of the type which employ static devices to perform the various annunciator logic functions. More particularly, this invention relates to electrical circuitry and components for monitoring the conditions of a group of variables and for indicating the presence of an alarm condition.

The increased complexity in manufacturing operations has necessitated a need for more or less continuous surveillance of a multiplicity of operating conditions simultaneously. Such surveillance is often accomplished by independent sensing and condition-responsive circuits, each of which is adapted to monitor a specific condition or physical parameter. Some of the conditions or parameters monitored require that the monitor circuit be signaled by the opening or closing of a set of condition-responsive contacts to indicate alarm conditions and, thus, operate in a manner which can be described as digital logic. In this type of monitor circuit, the condition-responsive contacts may be either normally closed or normally opened when the system being monitored is in the normal state. Other conditions or parameters monitored require that the monitor circuit operate in the analog logic to continuously compare the condition or parameter with a predetermined reference value and derive therefrom an electrical signal to indicate the alarm condition. These comparisons sometimes involve conditions or parameters approaching a maximum level and at other times involve conditions or parameters approaching a minimum level. Complete monitoring of the process or apparatus requires circuits which operate in both the digital logic and the analog logic. Otherwise, if complete monitoring is to be provided, two separate annunciator systems must be used.

The number of monitor circuits associated with any given process or apparatus will sometimes total in the hundreds of points, as the individual circuits are customarily called. Therefore, simplicity of design of these monitor circuits is of prime importance because even low cost circuits or units can aggregate a very large sum of money when a great number of points must be serviced. Also, because of the great number of circuits required, each circuit must be compact and occupy as small a space as possible. Furthermore, the electrical energy consumption may be so high as to be impractical where a large number of points are being monitored. The problem of reliability becomes of utmost importance in annunciator systems, since, otherwise, the system would not fulfill its intended purpose of forewarning the development of an abnormal condition or state. It has been the common practice in many annunciator systems to utilize control elements, such as relays and gas tubes, which have a high rate of failure in comparison to static control elements, such as transistors. Also, many monitor circuits lack temperature and electrical stability which lead to false indications of alarm conditions. In some monitor circuits the indication of an alarm state results from transient surge voltages or electrical noise spikes which cannot be prevented from occurring in such electrical circuits.

An object of this invention is to provide an annunciator system having an event indicating agency to identify normal, initial abnormal, and acknowledged abnormal conditions of the variable of the process and/or apparatus being monitored.

Another object of this invention is to provide an annunciator system wherein the event indicating agency is automatically reset to indicate normal conditions when the variable of the process and/or apparatus being monitored has returned to the state related to the normal condition.

Another object of this invention is to provide a low-cost annunciator system having a small number of components.

Another object of this invention is to provide an annunciator which is economical to operate and which is low in the consumption of electrical energy.

Another object of this invention is to provide an annunciator system which is reliable in operation and which possesses both temperature and electrical stability.

Another object of this invention is to provide an annunciator system which is flexible in operation and which not only permits monitoring of either or both analog and digital signals but also provides for changing from one type of signal to another type of signal to be monitored.

Another object of this invention is to provide an annunciator system which is constructed for versatility by being readily adapted for an increase or decrease in the number of points monitored.

Other aspects, objects and advantages of this invention will be apparent to one skilled in the art upon studying this disclosure and the attached drawings.

In accordance with this invention, there is provided an annunciator system for providing a plurality of observable indications of the occurrences of normal, initial abnormal and acknowledged abnormal conditions of each of a plurality of variables and automatically resetting the acknowledged abnormal indication to show normal conditions whenever the condition of each of the variables monitored returns to the normal state, said annunciator system comprising a plurality of readily interchangeable electrical circuits, hereinafter referred to as "alarm" circuits, the number of said alarm circuits being equal to the number of variables monitored, each of said alarm circuits comprising a first alarm means connected across a power source, a transistor operating in the switching mode in series with said first alarm means for switching said first alarm means on and off, a second alarm means connected across said power source, a solid state controlled rectifier in series circuit with said second alarm means for switching said second alarm means on, a voltage-dropping resistor connected between one side of said power source and the base electrode of said transistor, a coupling means connected between the gate control element of said solid state controlled rectifier and a signal driving point intermeidate the connection between said voltage-dropping resistor and the base electrode of said transistor, an alarm switch means responsive in position to the state of the variable monitored and connected between said signal driving point and one side of power source to unblock said transistor and thereby operate said first alarm means and to switch said solid state controlled rectifier from its nonconducting to its conducting state and thereby operate said second alarm means, and an acknowledgment switch means for momentarily interrupting the voltage obtained from said power source to thereby switch said solid state controlled rectifier from its conducting to its nonconducting state and terminate the operation of said second alarm means without affecting the operation of said first alarm means.

A particular feature of the present invention is the provision for monitoring many types of signals. For instance, the variable monitored may involve a simple off-on device devolping digital type signals wherein alarm conditions are signaled by the opening and closing of a set of condition-responsive contacts. In this form of the invention, the alarm switch means comprises a conventional mechanical switch apparatus having contacts which permit the making and breaking of electrical circuits. Also, the variable being monitored may involve analog type signals wherein the signal from the variable monitored is a continuous one which varies in amplitude. The analog type signal reqirues that the condition of the variable monitored be continuously compared to a predetermined reference value defining the transition from normal to abnormal condition of the variable in order to derive an electrical signal to indicate an alarm condition. In this form of the invention, the alarm switch means is an electrical circuit, hereinafter referred to as an "analog" circuit, which comprises a transistor operating in the switching mode, a voltage source means and resistance means coupled to the base of said transistor for switching said transistor between the off and on positions in accordance with the voltage drop across said resistance means, and a comparison circuit means having an output signal coupled to said voltage source for changing the voltage drop across said resistance whenever the level of a sample voltage signal proportional to the state of the variable monitored is outside the limits of a reference voltage defining normal operation of the variable monitored.

When digital type signals are to be monitored, the alarm circuit must function as if it were constructed with a conventional mechanical switch which is either normally opened or normally closed when the condition of the variable monitored is normal. Thus, the alarm circuit of this invention for use with variable developing digital type signals is provided in two forms, depending upon the state of the condition-responsive contacts during normal condition of the variable.

When analog type signals are to be monitored, the analog circuit is substituted as the alarm switch means for the mechanical switch in the alarm circuit. The analog switch circuit indicates either or both high level and low level alarm conditions of the variable monitored. Thus, alarm indication is provided whenever the condition of the variable either falls below a predetermined normal down-level limit or rises above a predetermined normal up-level limit and, therefore, whenever the condition of the variable is outside the limits of the range which define normal condition for the variable. The analog circuit is desirably constructed of one of three forms to provide up-level alarm, down-level alarm, or both up-level and down-level simultaneously.

A unique feature of the present invention is that an annunciator system is provided in the form of an assembly of circuits having the same or different alarm functions which can be readily added or subtracted from the system as desired in accordance with the character of the alarm functions needed and the number of points to be monitored. Each circuit is constructed with its components mounted on a single circuit board having electrical contacts for insertion in the system. Only those circuit boards having the desired alarm functions are used in the system and unnecessary alarm functions are not present, thus minimizing cost of the system. The alarm circuit boards are of two types in order to provide for either a normally open or a normally closed alarm switch position when the variable is in the normal condition; however, the same alarm circuit board is usually used for each type and the change required with either normally open or normally closed contacts effected in the electrical contacts of the board for insertion in the system. The analog circuit boards are of three types and have either low-level alarm, high-level alarm, or both low- and high-level alarm indication. In each case, the analog circuit board must be added to the alarm circuit board to provide the alarm indication.

A most important feature of the present invention is that two event indicating agencies show the state of alarm conditions for each variable monitored and both event indicating agencies always become operative when the condition of the variable initially becomes abnormal. A manual acknowledgment switch is provided for terminating the operation of one event indicating agency, leaving the other event indicating agency operative, to thereby show an acknowledged abnormal condition. The remaining operative event indicating agency continues to operate until the condition of the variable returns to normal, at which time the operative event indicating agency automatically resets itself by terminating operation to indicate normal condition of the variable. Each event indicating agency may provide the same type of indication to show alarm conditions; however, usually each event indicating agency has different characteristics in order to distinguish one from the other. For example, one event indicating agency may be a visible alarm such as a lamp and the other may be an audible alarm such as a horn. If each event indicating agency is a lamp, each lamp either has a different characteristic color, a different level of brilliance or a different state of operation such as steady or flashing operations. Also, each event indicating agency may include more than one audible or visible alarms combined together to give simultaneous indications of alarm.

For example, a lamp may be combined with a horn to act as one event indicating agency. In a preferred arrangement, one event indicating agency is a lamp of a particular color and the other event indicating agency is a lamp of a different color in combination with a horn. Thus, in the preferred arrangement, all alarms become operative when the condition of the variable initially becomes abnormal and the combined lamp and horn alarm becomes inoperative when the acknowledgment switch is activated. The single lamp remains operative until the condition of the variable returns to the normal state, at which time the lamp automatically extinguishes itself, thereby indicating normal condition.

In the drawings, FIGURE 1 is a schematic wiring diagram of an alarm circuit having an alarm switch means which is normally closed when the state of the variable being monitored is in the normal state.

FIGURE 2 is a schematic wiring diagram of an alarm circuit having an alarm switch means which is normally opened when the state of the variable being monitored is in the normal state.

Figure 3:
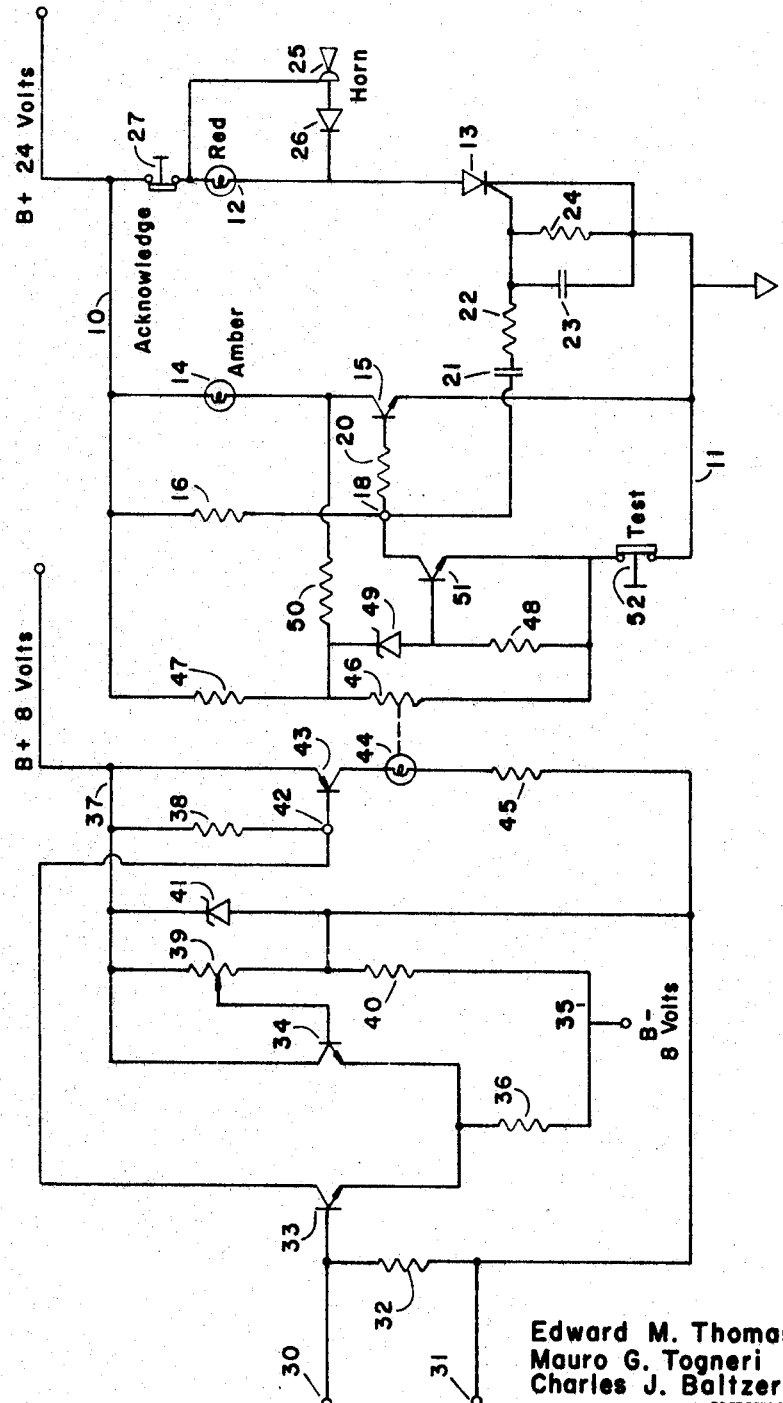
FIGURE 3 is a schematic wiring diagram of an analog circuit alarm switch means providing high level alarm combined with the alarm circuit of FIGURE 1.

Referring to FIGURE 1, B+ voltage, preferably 24 volts even though other values of voltage may be used, is applied to the alarm circuit through common bus 10 and common ground 11 which, if desired, can be connected to the negative side of the voltage source instead of ground. Incandescent lamp 12, preferably red in color, is connected between bus 10 and the anode of silicon controlled rectifier 13 which has its cathode connected to ground 11. Lamp 14, which is preferably amber in color, is connected between bus 10 and the collector of switching transistor 15 which has its emitter connected to ground 11. Dropping resistor 16 is connected between bus 10 and one side of normally closed switch 17 with signal driving point 18 intermediate therebetween. The other side of switch 17 is connected to ground 11 through test switch 19. Current limiting resistor 20 is connected between the base of switching transistor 15 and signal driving point 18. Coupling capacitor 21 and filtering resistor 22 are connected in series between signal driving point 18 and the gate control element of silicon controlled rectifier 13 with one side of capacitor 21 being connected to signal driving point 18. Filter capacitor 23 and impedance resistor 24 are connected in parallel between the gate control element of silicon controlled rectifier 13 and ground 11. Horn 25 is connected through isolation diode 26 to a point intermediate the connection between bus 10 and the anode of silicon controlled rectifier 13. Acknowledgment switch 27 is provided in the connection to common bus 10 to terminate the B+ voltage supplied to red lamp 12, silicon controlled rectifier 13 and horn 25.

In operation of the alarm circuit of FIGURE 1, the contacts of switch 17 are normally in the closed position when the condition of the variable being monitored is in the normal state. When the contacts of switch 17 are in this position, signal driving point 18 is at ground potential and switching transistor 15, which is of the NPN type, is blocked because the emitter of transistor 15 is also at ground potential. With switching transistor 15 blocked to the flow of current, amber lamp 14 is off. Silicon controlled rectifier 13 is also in the blocked state because there is no path for current flow through coupling capacitor 21 which has one side at ground potential through normally closed switch 17. Neither horn 25 nor red lamp 12 are in operating condition because there is no current flow through blocked silicon controlled rectifier 13. When an alarm condition exists, the contacts of normally closed switch 17 open which permits the voltage at signal driving point 18 to rise towards the level of the B+ voltage source supplied by bus 10. Upon occurrence of the rise in voltage at signal driving point 18, the voltage at the base of switching transistor 15 rises and unblocks transistor 15 to permit current flow to thereby light amber lamp 14 and show an alarm condition to exist. Current flow to the base of transistor 15 is limited by current-limiting resistor 20. Also, upon the occurrence of the rise in voltage at signal driving point 18, coupling capacitor 21 becomes charged by the flow of current through impedance matching resistor 24 and the cathode-gate control element of silicon controlled rectifier 13. This charging current from coupling capacitor 21 is sufficient to convert silicon controlled rectifier 13 from the blocked state to the conducting state, thereby permitting current to flow through red lamp 12 and to horn 25. Thus, red lamp 12 and horn 25 also indicate an alarm condition for the variable monitored. Horn 25 and red lamp 12 are turned off by momentarily opening the contacts of acknowledge switch 27 which cuts off the supply of B+ voltage to red lamp 12, horn 25 and silicon controlled rectifier 13. When acknowledge switch 27 is released, amber lamp 12 is still on because the contacts of normally closed switch 17 are still open and switching transistor 15 is still in the conducting state. However, red lamp 12 and horn 25 do not again become operative when acknowledge switch 27 is released because interruption of the voltage terminated the conducting state of silicon controlled rectifier 13 and coupling capacitor 21 remains charged to thereby prevent the flow of current through the gate control element of silicon controlled rectifier 13. Amber lamp 14 will continue to be operative until the condition of the variable monitored returns to the normal state and the contacts of switch 17 are closed, thereby blocking switching transistor 15. Impedance matching resistor 24 serves to provide the proper gate impedance for silicon controlled rectifier 13 to thereby prevent false triggering of rectifier 13 by noise which would give an alarm indication of an abnormal condition of the variable being monitored. Filter resistor 22 and filter capacitor 23 also serve to prevent false triggering of silicon controlled rectifier 13, thus providing a highly reliable alarm circuit.

If desired, the alarm circuit may be constructed with acknowledge switch 27 connected between B+ and bus 10 to interrupt the B+ voltage to both amber lamp 14 and red lamp 12. In this variation of the circuit, coupling capacitor 21 must have sufficient capacitance, for example 10 mfd., to prevent the discharge of the capacitor during the time interval the application of B+ voltage to the circuit is terminated by the depressing of acknowledge switch 27. A transformer may be used in place of capacitor 21 as a coupling means in the embodiment of FIGURE 1. Also, current-limiting resistor 20, filter resistor 22, and filter condenser 23 may be eliminated from the circuit; however, the circuit would be less reliable and tend to give false indications of alarm conditions.

An alarm circuit for use with condition-responsive contacts which are normally open when the condition of the variable monitored is in the normal state is shown in FIGURE 2. The circuits of FIGURE 1 and FIGURE 2 are very similar and the same reference numerals are used in FIGURE 2 to identify the similar components of FIGURE 1. Referring to FIGURE 2, dropping resistor 16 is connected between common bus 10 and one side of alarm switch 28. The other side is connected to signal driving point 18. There is no connection between signal driving point 18 and common ground 11 as in the circuit of FIGURE 1. Test switch 19 is connected in shunt across alarm switch 28.

The operation of the alarm circuit of FIGURE 2 is also similar to the operation of the alarm circuit of FIGURE 1. Thus, when alarm conditions of the variable monitored occur, the contacts of alarm switch 28 close to apply a positive voltage at signal driving point 18 which unblocks switching transistor 15 and silicon controlled rectifier 13, thereby permitting amber lamp 14, red lamp 12 and horn 25 all to become operative. Upon pressing acknowledgment switch 27, horn 25 is silenced and red lamp 12 is extinguished. Amber lamp 14 continues to be lighted until the condition of the variable being monitored returns to the normal state and the contacts of alarm switch 28 open.

The alarm circuit of FIGURE 3 is adapted for use with variables which have a characteristic analog type signal to indicate alarm condition when the signal exceeds a high level limit. Referring to FIGURE 3, an input voltage in the range of from 0 to 6 volts from a process instrument system is applied to terminals 30 and 31, of a polarity positive with respect to terminal 30 and negative to thermal 31 across impedance match resistor 32 which prevents the alarm circuit from overloading the process signal circuit and which provides a stable impedance. Transistors 33 and 34 form a differential amplifier circuit which is used as a comparison circuit. The emitters of each transistor are connected together and to common B— 35 through common feedback resistor 36. The collector of transistor 33 is connected through load resistor 38 to common bus 37 to which there is applied a B+ voltage, preferably 8 volts even though other values of voltage can be used. The collector of transistor 34 is connected directly to common bus 37. The base of transistor 33 is connected directly to input terminal 30 to provide a sample voltage between the base of transistor 33 and common B— 35. A constant reference voltage for the comparison circuit is provided by adjustable resistor 39, resistor 40, and Zener diode 41. Resistors 39 and 40 are connected in series between bus 37 and B— 35 with resistor 39 connected to bus 37. Zener diode 41 is connected in shunt across adjustable resistor 39. The negative side of Zener diode 41 is also connected to input terminal 31. The wiper arm of adjustable resistor 39 is connected to the base of transistor 34. Transistors 33 and 34 operate to compare the reference voltage between the base and emitter of transistor 34 with the sample voltage between the base and emitter of transistor 33, presenting an output voltage at test point 42 of the collector of transistor 33 which is indicative of the differences between the reference voltage and the signal voltage across terminals 30 and 31.

Switching transistor 43, lamp 44, current-limiting resistor 45 and variable resistor 46 constitute a coupling circuit. Switching transistor 43 has its emitter connected to common bus 37 and its collector connected to lamp 44. The other side of lamp 44 is connected to current-limiting resistor 45 which is also connected to the negative side of Zener diode 41. The base of switching transistor 43 is connected to test point 42. Lamp 44 and variable resistor 46 comprise a photosensitive Raysistor wherein variable resistor 46 has high resistance when lamp 44 is not lighted but low resistance when lamp 44 is lighted.

Variable resistor 46, resistor 47, resistor 48, Zener diode 49, resistor 50 and switching transistor 51 simulate the action of a condition-responsive switch such as alarm switch 17 in FIGURE 1. Variable resistor 46, resistor 47, resistor 48 and Zener diode 49 form a voltage divider network with one side of resistor 47 connected to common bus 10 and the other side connected to variable resistor 46 which is connected at its other end to common ground 11. Zener diode 49 and resistor 48 are connected in series and both connected in shunt across variable resistor 46 with one end of resistor 48 being connected to common ground 11. The base of transistor 51 is connected at a point intermediate the connection between Zener diode 49 and resistor 48. The emitter of switching transistor 51 is connected to ground 11 through test switch 52. The collector of switching transistor 51 is connected directly to signal driving point 18. The remainder of the alarm circuit of FIGURE 3 is the same as the alarm circuit of FIGURE 1 except the feedback resistor 50 is connected between the collector of switching transistor 15 and a point intermediate the connection between variable resistor 46 and resistor 47.

In the operation of the alarm circuit of FIGURE 3, transistor 33, which is of the NPN type, is normally blocked to conduction whereas the bias across resistor 39 is such that transistor 34, which is also of the NPN type, is unblocked to conduction. Switching transistor 43, which is of the PNP type, is blocked to conduction by the voltage drop across transistor 33, resistor 36 and resistor 38. Lamp 44 is normally off because there is no current flow through blocked switching transistor 43. Because lamp 44 is off, variable resistor 46 has a very high resistance and the voltage drop across resistor 46 is sufficiently high that Zener diode 49 is normally conducting. With Zener diode 49 conducting, the voltage drop across resistor 48 is sufficiently positive that switching transistor 51, which is of the NPN type, is unblocked and in the state of conducting. Thus, when the conditions of the variable monitored are in the normal state, switching transistor 51 and the associated circuit simulate an alarm switch having normally closed contacts to signal driving point 18 and the remainder of the alarm circuit.

Whenever the signal from the variable monitored presents a voltage at input terminal 30 which exceeds the voltage between the base of transistor 34 and common B— 35, transistor 33 is unblocked and starts to conduct whereas transistor 34 becomes blocked an ceases to conduct. A positive feedback is provided through common feedback resistor 36 which speeds up the unblocking of transistor 33 and the blocking of transistor 34. When transistor 33 unblocks, there is heavy current flow through load resistor 38, resulting in a low voltage signal at test point 42, which is the output of the comparison circuit comprising transistors 33 and 34. The reduction in voltage at test point 42 is applied to the base of switching transistor 43 to unblock the same and to permit current flow through lamp 44. The light from lamp 44 is coupled onto variable resistor 46 which falls in value from a very high resistance to a very low resistance. The decrease in resistance of variable resistor 46 also reduces the voltage across Zener diode 49 which ceases to conduct when the voltage decreases beyond the Zener region. With no current flow through resistor 48 and Zener diode 49, the base of switching transistor 51, which is of the NPN type, approaches ground potential and switching transistor 51 becomes blocked, resulting in a rise in potential at the collector of transistor 51 and, accordingly, a rise in potential at signal driving point 18. Positive feedback to speed up the blocking of transistor 51 is provided from the collector of switching transistor 15 through feedback resistor 50 and Zener diode 49 to the base of switching transistor 51. The remainder of the operation of the circuit is similar to the operation of the circuit of FIGURE 1. That is, the rise in potential at signal driving point 18 raises the potential at the base of switching transistor 15 and unblocks the same to permit current flow through amber lamp 14 to light the same and indicate an alarm condition. The rise in potential at signal driving point 18 also permits coupling capacitor 21 to charge up by current flow through impedance matching resistor 24 and the gate control element of silicon controlled rectifier 13 which starts silicon controlled rectifier 13 conducting. Upon the flow of current through silicon controlled rectifier 13, red lamp 12 is turned on and horn 25 is made operative. Amber lamp 14, red lamp 12 and horn 25 continue to operate until acknowledge switch 27 is depressed to terminate the B+ voltage applied to red lamp 12, horn 25 and silicon controlled rectifier 13 through bus 10. Upon release of acknowledge switch 27, red lamp 12 and horn 25 remain inoperative because silicon controlled rectifier 13 is again in a blocked state. Silicon controlled rectifier 13 cannot become operative even though switching transistor 15 is in an unblocked state and amber lamp 14 is on because coupling capacitor 21 is still charged up by the B+ voltage applied through resistor 16, thereby preventing the flow of current through the gate control element of silicon controlled rectifier 13.

Amber lamp 14 will remain on so long as the condition of the variable monitored is in the abnormal state as determined by the position of the wiper arm of adjustable resistor 39 which adjusts the reference voltage applied between the base and emitter of transistor 34 in the comparison circuit. Whenever the input voltage applied to terminal 30 falls below the reference voltage applied to transistor 34, transistor 33 will become blocked and transistor 34 will become unblocked. Upon the blocking of transistor 33, the voltage at test point 42 rises in magnitude and blocks switching transistors 43. The blocked condition of transistor 43 turns off lamp 44 which permits the resistance of variable resistor 46 to rise. The increase in resistance in variable resistor 46 permits both Zener diode 49 and switching transistor 51 to become unblocked, resulting in a fall in potential at signal driving point 18. The drop in potential at signal driving point 18 blocks switching transistor 15 and thereby extinguishes lamp 14.

Although the analog circuit of FIGURE 3 is described for input signals in the range of 0–6 volts, input signals of various magnitudes of voltage can be used. For example, the input signal may range from 0 to 10 volts, or from 8 to 20 volts, or to even higher values.

The circuit of FIGURE 3 is described containing a photosensitive coupling circuit for transmitting the voltage signal from test point 42 to the base of switching transistor 51. Such a circuit is preferred in an annunciator system of this invention because the comparison circuit is electrically isolated from the switching circuit and false triggering of the alarm indicator is prevented. However, if some loss in reliability can be tolerated, other known conventional coupling circuits may be used and, in fact, the output voltage at test point 42 may be coupled directly to the base of switching transistor 51. In the photosensitive coupling circuit, switching transistor 43 can be replaced by any electrical switching means, such as a Zener diode, a gas tube, or a relay. Although the drawing in FIGURE 3 shows a B+ voltage of 24 volts applied to the alarm circuit but a B+ voltage of only 8 volts applied to the analog circuit, the same value of B+ voltage may be applied to each circuit. However, the B+ voltage for each circuit is preferably supplied from separate voltage sources in order to minimize interaction between the two circuits.

Figure 4:
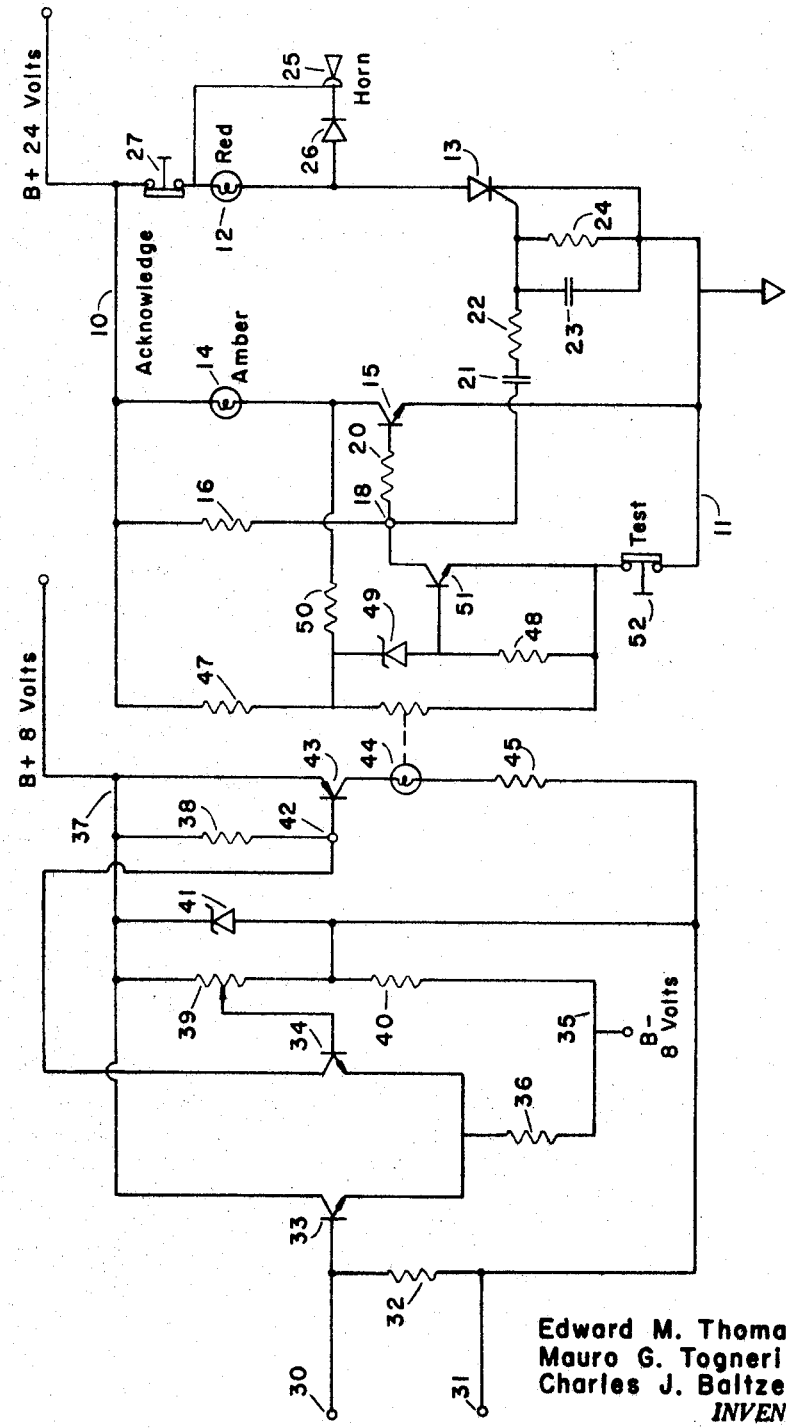
FIGURE 4 is a schematic wiring diagram of an analog circuit alarm switch means providing low level combined wth the alarm circuit of FIGURE 1.

The alarm circuit of FIGURE 4 is adapted for use with variables which have a characteristic analog type signal to indicate alarm condition when the signal falls below a low level limit. The circuit of FIGURE 4 is very similar to the circuit of FIGURE 3 in that all of the electrical components are the same and only the connections between several of the components are different. Accordingly, the same reference numerals are used in FIGURE 4 to identify the similar components of FIGURE 3. Referring to FIGURE 4, the collector of transistor 33 is connected directly to common bus 37 instead of being connected to test point 42 in FIGURE 3. The collector of transistor 34 is connected to test point 42 instead of being connected directly to common bus 37 as in FIGURE 3.

In the operation of the alarm circuit of FIGURE 4, transistor 33 is normally conducting whereas transistor 34 is normally blocked to conduction. The remainder of the components in the circuit of FIGURE 4 are in the same state as the components in FIGURE 3 during normal condition of the variable monitored. Whenever the signal of the variable monitored becomes more negative than the reference voltage adjusted across adjustable resistor 39, transistor 33 begins to block and transistor 34 begins to unblock. The blocking and unblocking of these transistors is speeded up by the positive feedback through common feedback resistor 36. Upon the blocking of transistor 34, there is substantial current flow through resistor 38, transistor 34 and resistor 36, resulting in a drop in voltage at test point 42, which in the output of the comparison circuit comprising transistors 33 and 34. The drop in voltage at test point 42 operates in the same way in the circuit of FIGURE 4 as in the circuit of FIGURE 3 to unblock transistor 43, turn on lamp 44, decrease the resistance of variable resistor 46, block Zener diode 49, block transistor 51, and increase the potential at signal driving point 18. The rise in potential at signal driving point 18 unblocks transistor 15 and silicon controlled rectifier 13 to make amber lamp 14, red lamp 12 and horn 25 operative. Pressing of acknowledge switch 27 operates in the same manner in the circuit of FIGURE 4 as in the circuit of FIGURE 3. Amber lamp 14 will continue to be operative until the level of the voltage at input terminal 30 rises above the reference voltage applied between the base and emitter of transistor 33 to unblock the same. The unblocking of transistor 33 and the corresponding blocking of transistor 34 results in the potential at test point 42 rising sufficiently to block transistor 43 as in the circuit of FIGURE 3.

Figure 5:
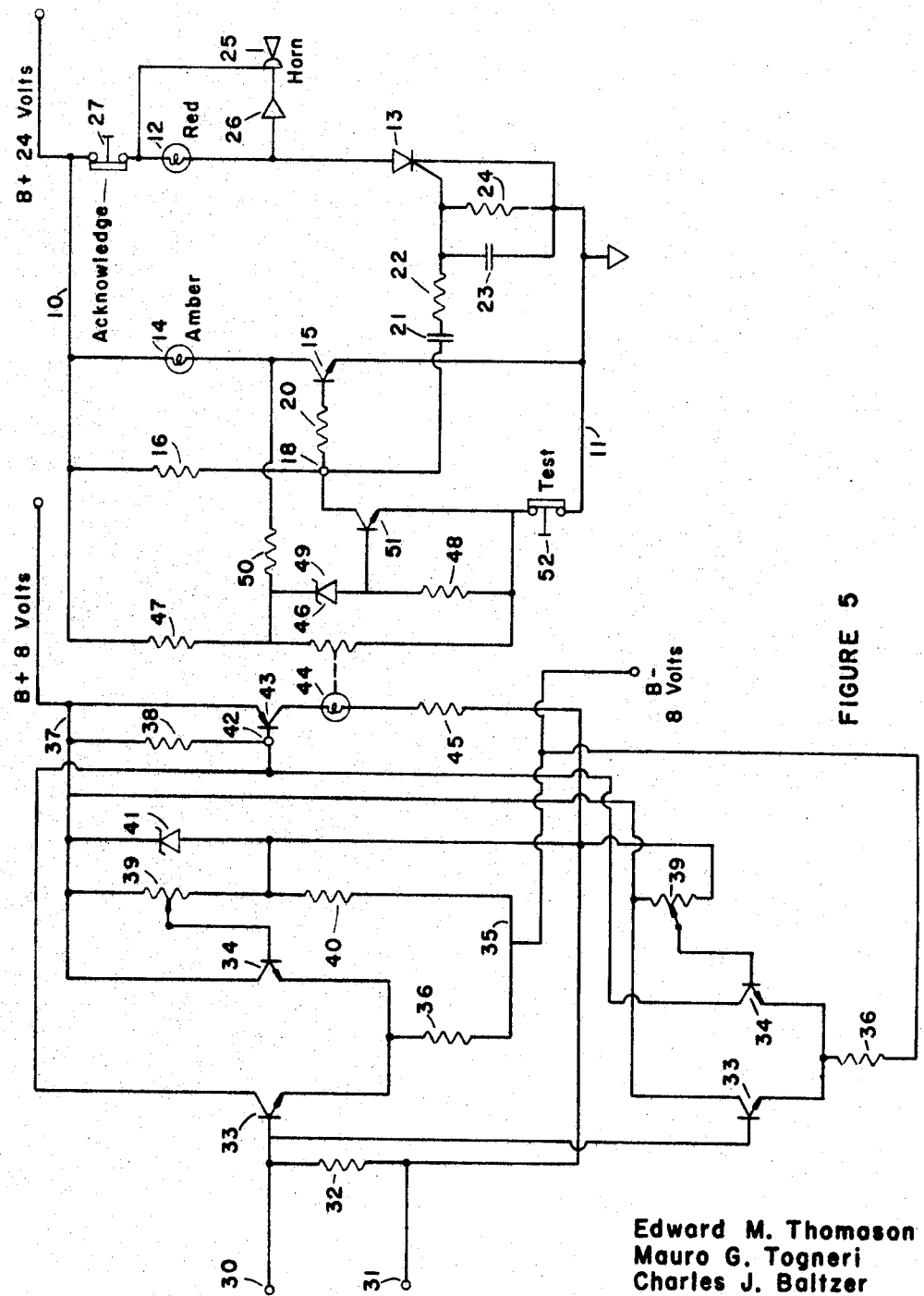
FIGURE 5 is a schematic wiring diagram of an analog circuit alarm switch means providing both high level and low level alarms combined with the alarm circuit in FIGURE 1.

The alarm circuit of FIGURE 5 is a composite of the circuit of FIGURES 3 and 4 adapted to indicate alarm conditions at both high-level and low-level limits of the variable monitored. The circuit of FIGURE 5 is the same as the circuit of FIGURE 3 except there is a duplication of transistor 33, transistor 34, resistor 36 and adjustable resistor 39.

The operation of the alarm circuit of FIGURE 5 is the same as the operation in each of the circuits of FIGURES 3 and 4. Thus, the high-level limit and the low-level limit, as determined by the setting on adjustable resistor 39 which adjusts the reference voltage for each of the comparison circuits, define the extremes of range of conditions for the normal state of the variable monitored. So long as the magnitude of the signal of the variable is below the high-level limit but above the low-level limit the condition of the variable is normal and amber lamp 14 and red lamp 12 are inoperative. However, when the magnitude of the signal either exceeds the high-level limit or falls below the low-level limit, the respective comparison circuit produces an output voltage at test point 42 which results in amber lamp 14 and red lamp 12 being made operative. Such alarm condition continues until amplitude of the signal again reaches a value between the low-level and high-level limits.

Figure 6:
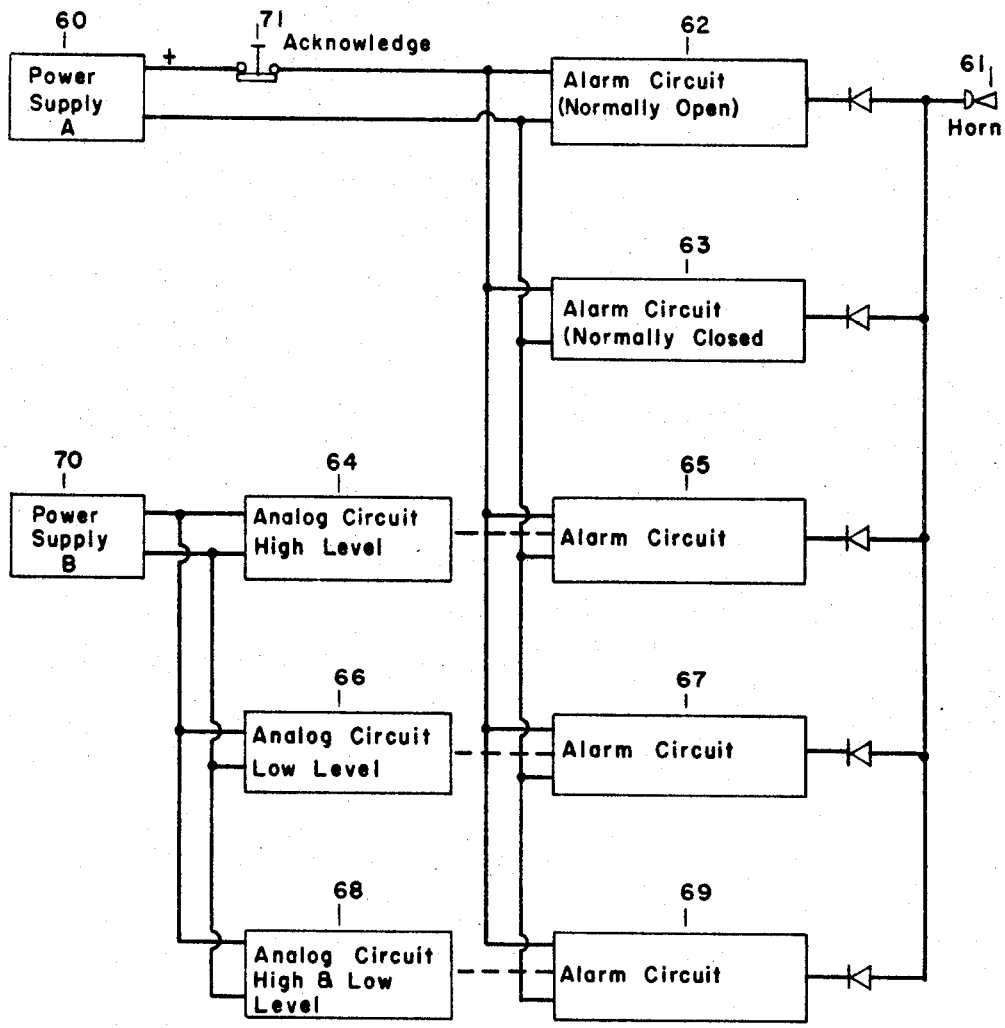
FIGURE 6 is a diagrammatic drawing showing an annunciator system in which the circuits of FIGURES 1 through 5, inclusive, are interconnected in one embodiment of the present invention.

Each of the alarm circuits described in FIGURES 1 through 5, inclusive, is constructed on separate circuit boards for the addition to or subtraction from the annunciator system, as needed, for the particular type of alarm functions to be monitored and the number of points necessary to be serviced. Usually, a single audible signal and a single power supply for each group of alarm circuits and analog circuits are used as common components in the preferred annunciator system; however, several such components may be used if desired. A complete annunciator system constructed from the separate alarm circuits described in each of FIGURES 1 through 5 is disclosed in FIGURE 6. Referring to FIGURE 6, power supply A–60 supplies the B+ voltage to five separate alarm circuits which operate to sound horn 61 upon occurrence of an alarm condition. Circuit board 62 supplies an alarm indication for use with a variable which requires normally open condition-responsive contacts when condition of the variable is normal. Circuit board 63 supplies an alarm indication for use with a variable which requires normally closed condition-responsive contacts when condition of the variable is normal. Circuit board 64, which is an analog circuit, together with circuit board 65, which is an alarm circuit, supply an alarm indication for use with analog type signals when the signal of the variable monitored approaches a high-level limit for the abnormal condition. Circuit board 66, which is an analog circuit, together with circuit board 67, which is an alarm circuit, supply an alarm indication for use with an analog type signal when the signal of the variable monitored approaches a low-level limit for the abnormal condition. Circuit board 68, which is an analog circuit, together with circuit board 69, which is an alarm circuit, supply an alarm indication for use with analog type signals when the signal variable monitored approaches either high- or low-level limits upon becoming abnormal in operation. Each of circuit boards 62, 63, 65, 67 and 69 is connected to a set of amber and red lamps for indicating alarm conditions. Power supply B–70 supplies the B+ voltage to analog circuit boards 64, 66 and 68. A single acknowledge switch 71 is used for acknowledging an alarm condition by extinguishing the particular red lamp lighted and silencing horn 61.

It will be understood that it will be possible to substitute transistors having the opposite sense of the NPN and the PNP type transistors described with respect to the circuits shown in the drawings provided that the polarity of the power supply is reversed. In some applications, alarm switch means 17 can be a thermistor instead of an analog circuit as described in the circuits of FIGURES 3 and 4. Also, if desired, alarm switch means 17 can be another transistor, such as a transistor in a computer circuit or a two-stage device such as a strain-gauge transistor or a photosensitive transistor. Although all the circuits of the drawings are described with silicon controlled rectifiers, any solid state controlled rectifier can be used. Alarm lamps 12 and 14 in the drawings are preferably incandescent type lamps; however, other types of visible indicating means can be used. For example, the lamps may be of either the neon or the argon glow types. With the latter types of lamps, switch transistor 15 can be eliminated, as will be readily apparent to one skilled in the art, but higher voltages must be used. High voltage components are more expensive than low voltage components and thus the cost of the annunciator system is unduly multiplied. Horn 25 is shown only diagrammatically in the drawings and the required oscillator, power amplifier, and voltage source are not shown in detail. The B+ voltage used in the circuits shown in the drawings is preferably 24 volts for the alarm circuits and 8 volts for the analog circuits; however, other magnitudes of voltage can be used, including voltages as high as 110 or 120 volts D.C. The same power supply can be used to supply B+ voltage to both the alarm circuits and the analog circuits but the use of separate voltages reduce interaction between circuits and improve the reliability of the annunciator system.

The term "variable," as used in this specification, means any measurable quantity, such as temperature, pressure, electrically actuated switch condition, mechanically actuated switch condition, speed, and the like, which indicates the condition of operation of a chemical process, method or apparatus. The annunciator system of this invention can be employed in chemical process plants, power plants, refrigeration systems, fire detection systems, and other plants or systems wherein machines, electric circuit breakers, fluid treatment tanks, fluid flow and the like are involved.

Although a specific embodiment of the invention has been illustrated and described, it will be understood that the invention is not limited thereto since alterations and modifications will readily suggest themselves to persons skilled in the art without departing from the true spirit of the invention or from the scope of the annexed claims.

What is claimed is:

1. An annunciator system for providing a plurality of observable indications of the occurrences of alarm conditions of each of a plurality of variables, said annunciator system comprising a plurality of readily interchangeable alarm circuits, the number of said alarm circuits being equal to the number of variables monitored, each of said alarm circuits comprising, in combination,
   a first alarm means connected across a power source,
   a transistor operating in the switching mode in series with said first alarm means for switching said first alarm means on and off,
   a second alarm means connected across said power source,
   a solid state controlled rectifier in series circuit with said second alarm means for switching said second alarm means on,
   a voltage-dropping resistor connected between one side of said power source and the base electrode of said transistor,
   a coupling means connected between the gate control element of said solid state controlled rectifier and a signal driving point intermediate the connection between said voltage-dropping resistor and the base electrode of said transistor,
   an alarm switch means responsive in position to the state of the variable monitored and connected between said signal driving point and one side of said power source to unblock said transistor and thereby operate said first alarm means and to switch said solid state controlled rectifier from its nonconducting to its conducting state and thereby operate said second alarm means, and
   an acknowledgment switch means for momentarily interrupting the voltage obtained from said power source to thereby switch said solid state controlled rectifier from its conducting to its nonconducting state and terminate the operation of said second alarm means without affecting the operation of said first alarm means.

2. The combination recited in claim 1 wherein said alarm switch means is the normally open contacts of a condition-responsive switch.

3. The combination recited in claim 1 wherein said alarm switch means is the normally closed contacts of a condition-responsive switch.

4. The combination recited in claim 1 wherein said alarm switch means comprises, in combination,
   a transistor operating in a switching mode,
   a voltage source means and resistance means coupled to the base of said transistor for switching said transistor between the off and on positions in accordance with the voltage drop across said resistance means, and
   a comparison circuit means having an output signal coupled to said voltage source for changing the voltage drop across said resistance means whenever the level of a sample voltage signal proportional to the state of the variable being monitored is outside the limits of a reference voltage defining normal operation of the variable monitored.

5. The combination recited in claim 1 wherein said alarm switch means comprises, in combination,
   a transistor operating in a switching mode,
   a voltage source means and resistance means coupled to the base of said transistor for switching said transistor between the off and on positions in accordance with the voltage drop across said resistance means,
   an input circuit means for producing a sample voltage proportional to the variable monitored,
   a reference voltage circuit means for establishing a reference voltage defining the limits where the condition of the variable first becomes abnormal,
   a comparison circuit means responsive to said sample voltage and said reference voltage for presenting an output voltage signal whenever said sample voltage differs from said reference voltage, and
   coupling means for applying said output voltage across said resistance means to thereby change the switching of said transistor.

6. The combination of claim 5 wherein said coupling means is a photosensitive resistance coupling means.

7. The combination recited in claim 1 wherein said alarm switch means comprises, in combination,
   a transistor operating in a switching mode,
   a voltage source means and resistance means coupled to the base of said transistor for switching said transistor between the off and on positions in accordance with the voltage drop across said resistance means,
   an input circuit means for producng a sample voltage proportional to the variable monitored,
   a reference voltage circuit means for establishing a reference voltage defining the limits where the condition of the variable first becomes abnormal,
   a comparison circuit means responsive to said sample voltage and said reference voltage for presenting an output voltage signal whenever said sample voltage exceeds said reference voltage, and
   coupling means for applying said output voltage signal across said resistance means to thereby change the switching of said transistor.

8. The combination recited in claim 1 wherein said alarm switch means comprises, in combination,
   a transistor operating in a switching mode,
   a voltage source means and resistance means coupled to the base of said transistor for switching said transistor between the off and on positions in accordance with the voltage drop across said resistance means,
   an input circuit means for producing a sample voltage proportional to the variable monitored,
   a reference voltage circuit means for establishing a reference voltage defining the limits where the condition of the variable first becomes abnormal,
   a comparison circuit means responsive to said sample voltage and said reference voltage for presenting an output voltage signal whenever said sample voltage falls below said reference voltage, and
   coupling means for applying said output voltage signal across said resistance means to thereby change the switching of said transistor.

9. The combination in claim 1 wherein said alarm switch means comprises, in combination,
   a transistor operating in a switching mode,
   a voltage source means and resistance means coupled to the base of said transistor for switching said transistor between the off and on positions in accordance with the voltage drop across said resistance means, an input circuit means for producing sample voltages proportional to the variable monitored, a first reference voltage circuit means for establishing a first reference voltage defining the upper limit where the condition of the variable passes from the normal state to the abnormal state, a second reference voltage circuit means for establishing a second reference voltage defining the lower limit where the condition of the variable passes from the normal state to the abnormal state, a first comparison circuit means responsive to said sample voltage and said first reference voltage for presenting an output voltage signal whenever said sample voltage exceeds said first reference voltage, a second comparison circuit means responsive to said sample voltage and said second reference voltage for presenting an output voltage signal whenever said sample voltage falls below said second reference voltage, and coupling means for applying said output voltage signal across said resistance means to thereby change the switching of said transistor.

10. In an annunciator system, an alarm circuit for providing an observable indication of the occurrence of alarm conditions of a variable, said circuit comprising, in combination, a first alarm means connected across a power source, a transistor operating in a switching mode in series with said first alarm means for switching said alarm means on and off, a second alarm means connected across said power source, a silicon controlled rectifier in series circuit with said second alarm means for switching said second alarm means on, a voltage-dropping resistor connected in series with a current-limiting resistor between one side of said power source and the base electrode of said transistor, a capacitor coupling means connected between the gate control element of said silicon controlled rectifier and a signal driving point intermediate the connection between said voltage-dropping resistor and said current-limiting resistor, an impedance matching resistor connected between the gate control element of said silicon controlled rectifier and the ground side of said power source, an alarm switch means responsive in position to the state of the variable monitored and connected between said signal driving point and one side of said power source for applying an increased potential at said signal driving point, said increased potential at said signal driving point switching said transistor to the conducting state and operating said first alarm means, said increased potential at said signal driving point switching said silicon controlled rectifier to the conducting state and operating said second alarm means with a charging of said coupling capacitor means, and an acknowledgment switch means for momentarily interrupting the voltage obtained from said power source to thereby switch said silicon controlled rectifier to the nonconducting state and to terminate the operation of said second alarm means without affecting the operation of said first alarm means, the switching of said silicon controlled rectifier to the conducting state being prevented by the charge on said capacitor coupling means and the conducting of said transistor continuing until the potential at said signal driving point is reduced by operation of said alarm switch means upon the return of the variable monitored to the normal state.

11. The combination recited in claim 10 wherein said alarm switch means is the normally open contacts of a condition-responsive switch.

12. The combination recited in claim 10 wherein said alarm switch means is the normally closed contacts of a condition-responsive switch.

13. The combination recited in claim 10 wherein said alarm switch means comprises, in combination, an input circuit means for producing a sample voltage proportional to the variable monitored, a reference voltage circuit means for establishing a reference voltage defining the limits where the condition of the variable first becomes abnormal, a comparison circuit means responsive to said sample voltage and said reference voltage for presenting an output voltage signal whenever said sample voltage differs from said reference voltage, a switching means connected in series with a lamp across a voltage source, said switching means being switched on by said output voltage signal to thereby light said lamp, a first voltage divider means including a light-sensitive resistor therein, the light from said lamp being directed upon said light-sensitive resistor to reduce the value of resistance thereof and decrease the voltage drop across said light-sensitive resistor, a second voltage divider means including a bias resistor and a diode switch means having an abruptly increasing current characteristic connected in shunt across said light-sensitive resistor, the voltage drop across said bias resistor decreasing abruptly upon termination of conduction of said diode switch means, and a transistor operating in a switching mode and abruptly ceasing to conduct when the voltage drop across said bias resistor decreases to provide an open alarm switch means in response to the abnormal state of the variable monitored.

14. The combination recited in claim 13 wherein said comparison circuit means presents an output voltage signal whenever said sample voltage exceeds said reference voltage.

15. The combination recited in claim 13 wherein said comparison circuit means presents an output voltage signal whenever said sample voltage falls below said reference voltage.

References Cited

UNITED STATES PATENTS

| | | | |
|---|---|---|---|
| 3,124,793 | 3/1964 | Foster | 340—213.2 |
| 3,128,456 | 4/1964 | Silliman et al. | 340—213.1 |
| 3,222,577 | 12/1965 | Kennedy | 340—222 XR |

JOHN W. CALDWELL, *Primary Examiner.*

D. MYER, *Assistant Examiner.*